Oct. 29, 1929.  B. WELSER  1,733,845
WHEELED CONVEYER
Filed March 19, 1928
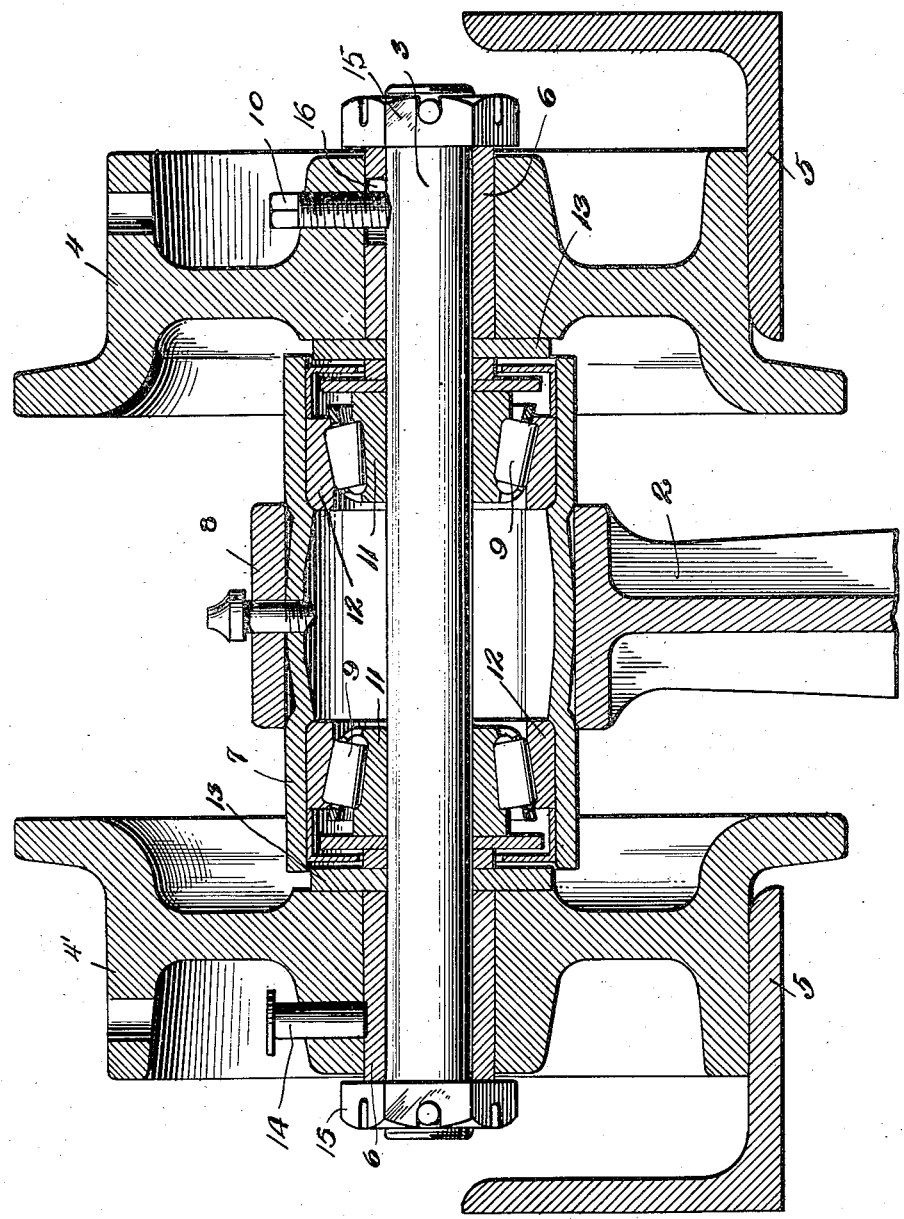
INVENTOR.
Brinton Welser,
BY Barber & Collings.
ATTORNEYS Patented Oct. 29, 1929

1,733,845

UNITED STATES PATENT OFFICE

BRINTON WELSER, OF MILWAUKEE, WISCONSIN, ASSIGNOR TO CHAIN BELT COMPANY, OF MILWAUKEE, WISCONSIN, A CORPORATION OF WISCONSIN

WHEELED CONVEYER

Application filed March 19, 1928. Serial No. 262,912.

This invention relates to wheeled conveyers, having been devised with special reference to embodiment in a trolley conveyer adapted for mechanical uses, though not limited in its useful applications to such particular type of apparatus.

The accompanying drawing illustrating the invention is a central transverse sectional view through the trolley portion of a suspended conveyer, parts being broken away.

In this drawing 2 indicates a load carrier which in the particular instance is a hanger of a trolley conveyer. The lower portion of this hanger is not represented. It may be a hook or other means for carrying a load. It is supported centrally by a shaft 3 on which are supported wheels 4, 4', adapted to run upon tracks 5. I prefer that these wheels should be mounted directly upon sleeves 6 secured fast to the shaft 3 near its ends and extending through the hubs of the wheels, the bushings being a little longer than the wheel hubs so that they project beyond the ends thereof and may take the outward end thrusts of the inner race elements of the roller bearings 9, which are interposed between the shaft and a housing or casing 7 located between the wheels. Nuts 15 secured to the shaft at its ends bear against the outer ends of the bushings. The nuts are preferably provided with some sort of locking means to prevent their turning upon the shaft after being adjusted to the desired position.

The load carrier 2 is hung from the housing or casing 7, the latter extending through an eye 8 formed in the upper end of the carrier. One of the wheels, 4', is free upon the sleeve 6 and is preferably provided with an oil cup 14 or other means for lubrication. The other wheel, 4, is secured fast to the shaft 3, so as to turn therewith and with the sleeve 6 on which it is directly mounted, by means of a set bolt 10 that passes through a slot 16 in the bushing. The slot permits the wheel to be adjusted endwise upon the shaft and sleeve to the desired position relative to the adjacent antifriction bearing 9 before being set. By the construction and arrangement of the parts that have been referred to, as described, that is with the wheels supported at the ends of the shaft, the load carrier supported by a casing or housing situated between the wheels and the antifriction bearings located between the shaft and the housing, the bending stresses upon the shaft are minimized so that the latter may be of materially smaller size for a carrier intended to transport a load of a given weight than is practicable in a wheel trolley constructed with the antifriction bearings directly between the wheels and the shaft and the load carrier hung directly upon the shaft between the wheels. The ends of the housings 7 are preferably overhung or covered by the flange and inner tread portions of the wheels as clearly represented in the drawing.

The antifriction bearings may be of any usual or desired construction, within wide limits, and hence need not be herein described in great detail. Suffice it to say that the drawings represent roller bearings with the usual inner races 11 secured to the shaft and upon which the rollers of the bearings run, and the outer races 12 that are securely mounted in the housing 7. Washers 13 are represented as arranged at the outer ends of the casing, and between the roller bearings and the inner faces of the wheel hubs, to retain lubricants.

A wheeled trolley carrier constructed as described operates as follows: When traveling along a straight piece of track the two wheels 4, 4', the sleeves 6 and the shaft 3 all turn together and relative to the carrier 2 and the housing or casing 7, the bearings 9 serving to reduce the friction of the turning parts. When the trolley is passing over a portion of curved track there is a differential movement of the two wheels, 4, 4', the wheel 4 rolling upon the track with which it engages causing the shaft to turn therewith. The wheel 4', also rolling upon its track, turns upon the sleeve 6, either faster than the wheel 4 or more slowly, accordingly as the track which it engages is the outer or inner one of the curve. By this expedient the grinding or dragging of one wheel upon the track when the conveyer passes a curve is avoided, the desired rolling action between the wheels and the rails being insured. It will also be seen that the arrangement described and illustrated provides roller bearings for the turning of parts of a traction mechanism in which but two sets of bearings are required for each pair of wheels supported upon a single shaft.

I have illustrated my invention in its simplest form as adapted to an overhead trolley vehicle with but a single pair of wheels. It will be apparent, however, to those familiar with the art that it is adapted for use in connection with wheeled conveyers of many kinds and types, and therefore the invention is not limited to the specific showing thereof represented, nor beyond the terms of the accompanying claims.

What I claim is:

1. A vehicle comprising a shaft, a pair of wheels supported thereon, one secured fast thereto and the other free to turn thereon, antifriction bearings for the shaft, and a casing in which are located the bearings carried by the vehicle and located between the wheels.

2. A wheeled conveyer comprising a load carrier, a shaft supporting such carrier, traction wheels on the shaft, one wheel being keyed thereto and the other free to turn relative thereto, and anti-friction bearings between the load carrier and the shaft.

3. An overhead trolley conveyer comprising a depending load-carrier, a shaft supported in the upper portion of such carrier, traction wheels on the shaft, one wheel being keyed thereto and the other free to turn thereon, a casing supported in the load carrier, and anti-friction bearings for the shaft mounted in the said casing.

4. A trolley conveyer comprising a pair of traction wheels, a shaft on which such wheels are supported, near its ends, a housing surrounding the central portion of the shaft, two sets of antifriction bearings for the shaft supported in the said housing near its ends, a load carrier depending from the housing, and means for securing one of the wheels to the shaft so that the two turn together, the opposite wheel being supported on the shaft so as to be free to turn thereon.

5. A vehicle comprising a shaft, a pair of wheels supported at the ends of the shaft, one secured fast thereto and the other loose thereon, a casing located between the wheels, antifriction bearings between the shaft and the casing and a support for the loads to be carried by the vehicle carried by the casing.

6. A vehicle such as described in claim 5 wherein the load support is a hanger suspended from the casing in which are located the antifriction bearings.

7. A vehicle such as described in claim 5 including bushings supported on the ends of the shaft, upon which are mounted the wheels, one wheel turning freely upon its bushing and the other being secured to the shaft and having a limited adjustment endwise before being set, the bushings being arranged to take the outward end thrusts of the bearings.

BRINTON WELSER.